(12) United States Patent
Hioki et al.

(10) Patent No.: US 11,440,129 B2
(45) Date of Patent: Sep. 13, 2022

(54) ELECTRODE FOR RESISTANCE SPOT WELDING

(71) Applicant: TOYOTA JIDOSHA KABUSHIKI KAISHA, Toyota (JP)

(72) Inventors: Toru Hioki, Miyoshi (JP); Manabu Ooga, Toyota (JP); Tomonori Yanagawa, Toyota (JP); Shun Kato, Ichinomiya (JP); Takashi Goto, Toyota (JP); Hideaki Matsuoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 392 days.

(21) Appl. No.: 16/674,064

(22) Filed: Nov. 5, 2019

(65) Prior Publication Data
US 2020/0156178 A1 May 21, 2020

(30) Foreign Application Priority Data

Nov. 16, 2018 (JP) .............................. JP2018-215358

(51) Int. Cl.
 *B23K 11/30* (2006.01)
 *B23K 11/11* (2006.01)
(52) U.S. Cl.
 CPC ............ *B23K 11/30* (2013.01); *B23K 11/115* (2013.01)
(58) Field of Classification Search
 CPC .... B23K 11/115; B23K 11/30; B23K 35/0205
 USPC ........................................................ 219/119
 See application file for complete search history.

(56) References Cited

U.S. PATENT DOCUMENTS

| 2,379,187 | A |   | 6/1945 | Richards |            |
|-----------|---|---|--------|----------|------------|
| 5,304,769 | A | * | 4/1994 | Ikegami  | B23K 35/0205 |
|           |   |   |        |          | 219/119    |

FOREIGN PATENT DOCUMENTS

| JP | 52-136923   | U |   | 10/1977 |
|----|-------------|---|---|---------|
| JP | 4-339573    | A |   | 11/1992 |
| JP | 5-96382     | A |   | 4/1993  |
| JP | 2000-288744 | A |   | 10/2000 |
| JP | 2007-301606 | A |   | 11/2007 |
| JP | 2007301606  |   | * | 11/2007 |

OTHER PUBLICATIONS

Combined Chinese Office Action and Search Report dated Mar. 3, 2021 in Patent Application No. 201911076672.X (submitting English language translation only), 6 pages.
Hong Songtao, et al., "Comprehensive Guide for Resistance Welding," Shanghai Science and Technology Press, Aug. 2012, 4 pages.

* cited by examiner

*Primary Examiner* — Dana Ross
*Assistant Examiner* — Joseph W Iskra
(74) *Attorney, Agent, or Firm* — Oblon, McClelland, Maier & Neustadt, L.L.P.

(57) ABSTRACT

An electrode tip portion is provided with a projection portion and a plurality of recess portions. The plurality of the recess portions are independent of one another, and are provided at the electrode tip portion in a dispersed manner. The projection portion is a region other than regions where the recess portions are provided, and is configured to be equipped with a continuous surface that continues in regions among the plurality of the recess portions.

9 Claims, 7 Drawing Sheets

ELECTRODE FOR RESISTANCE SPOT WELDING

INCORPORATION BY REFERENCE

The disclosure of Japanese Patent Application No. 2018-215358 filed on Nov. 16, 2018 including the specification, drawings and abstract is incorporated herein by reference in its entirety.

BACKGROUND

1. Technical Field

The disclosure relates to an electrode for resistance spot welding. In particular, the disclosure relates to an improvement in an electrode tip portion.

2. Description of Related Art

As an electrode used for resistance spot welding of metal plate materials (an electrode for resistance spot welding), there is known an electrode having an electrode tip portion (a surface of the electrode tip portion) where a projection portion and a recess portion are provided to destroy an oxidation film present on surfaces of the metal plate materials (especially aluminum alloy plate materials) (e.g., see Japanese Patent Application Publication No. 2000-288744 (JP 2000-288744 A)).

The electrode disclosed in this Japanese Patent Application Publication No. 2000-288744 (JP 2000-288744 A) has the electrode tip portion where a projection portion and a recess portion with the shape of sawteeth are provided. The projection portion and the recess portion spread in a concentric ripple shape in a circumferential direction at a small pitch that does not exceed a target nugget diameter. By recessing and projecting the electrode tip portion in this manner, the oxidation film can be destroyed over an extensive range, and current can be kept from concentrating on part of each of the metal plate materials (current can be kept from concentrating on a weak region of the oxidation film in a state where the oxidation film is not destroyed) at the time of resistance spot welding (when the metal plate materials are held by a pair of such electrodes). Thus, the temperature can be restrained from rising locally, and the electrode tip portion can be restrained from melting and adhering to each of the metal plate materials.

SUMMARY

When a projection portion and a recess portion are provided in the electrode tip portion as described previously, the contact area between the electrode and each of the metal plate materials is small (the contact area is smaller than in the case where the entire electrode tip portion is a flat surface), and current concentrates on a contact region between the electrode and each of the metal plate materials. However, the target nugget diameter can be obtained by setting the diameter of the projection portion and the recess portion (the projection portion and the recess portion assuming the shape of sawteeth spreading like concentric ripples in the circumferential direction) in accordance with the target nugget diameter in the configuration of Japanese Patent Application Publication No. 2000-288744 (JP 2000-288744 A).

However, the configuration of this Japanese Patent Application Publication No. 2000-288744 (JP 2000-288744 A) causes a new problem in that the welding current value for obtaining the target nugget diameter (the amount of energy necessary for resistance spot welding) significantly increases as a result of the contact area that has become small. That is, the configuration of this Japanese Patent Application Publication No. 2000-288744 (JP 2000-288744 A) can restrain the electrode tip portion from melting and adhering to each of the metal plate materials, but causes a significant increase in the amount of energy needed to obtain the target nugget diameter. This significant increase in the necessary amount of energy is unfavorable because an electric power supply device is enlarged in size and environmental deterioration is caused.

The disclosure provides a configuration that can curtail an amount of energy needed to obtain a target nugget diameter in an electrode for resistance spot welding whose electrode tip portion has the projection portion and the recess portion.

An aspect of the disclosure relates to an electrode for resistance spot welding that is adapted to hold a plurality of metal plate materials superimposed on one another along a plate thickness direction thereof and join the metal plate materials to one another through energization. Moreover, in this electrode for resistance spot welding, an electrode tip portion configured to hold each of the metal plate materials is provided with a projection portion and a plurality of recess portions, the plurality of the recess portions are independent of one another and are provided in the electrode tip portion in a dispersed manner, and the projection portion is a region other than regions where the recess portions are provided and is configured to be equipped with a continuous surface that continues in regions among the plurality of the recess portions without being divided by the recess portions.

Owing to this configuration, when each of the metal plate materials is held by the electrode for resistance spot welding at the time of resistance spot welding, a film (e.g., an oxidation film) present on a surface of each of the metal plate materials can be destroyed over an extensive range by the projection portion that is provided on the electrode tip portion, current can be kept from concentrating on part of each of the metal plate materials (current can be kept from concentrating on a weak region of the film in a state where the film is not destroyed), and the electrode tip portion can be restrained from melting and adhering to each of the metal plate materials. Besides, the plurality of the recess portions that are provided in the electrode tip portion are independent of one another, and are dispersed at the electrode tip portion. Therefore, current paths can be further restrained from being enlarged due to a fringing phenomenon at the projection portion (the current paths can be further restrained from being enlarged in a direction perpendicular to the plate thickness direction of each of the metal plate materials), and a higher current density can be ensured in each of the current paths than in the configuration in which these recess portions are continuous along the circumferential direction (the configuration of Japanese Patent Application Publication No. 2000-288744 (JP 2000-288744 A)). Therefore, the respective metal plate materials can be joined to one another by efficiently melting the metal plate materials while keeping the welding current value low. Besides, this projection portion is the region other than the regions where the recess portions are provided, and hence reaches an outer edge portion of the electrode tip portion. In general, the outer diameter of the electrode tip portion is set in accordance with the target nugget diameter. As a result, the amount of energy needed to obtain the target nugget diameter can be curtailed in the electrode for resistance spot welding whose electrode tip portion has the projection portion and the recess portions.

Besides, the continuous surface that constitutes the projection portion may be formed as a projecting curved surface that bulges most at a position on an electrode centerline.

According to this, the current flowing through each of the metal plate materials at the time of resistance spot welding can be more appropriately distributed (the degree of bias in current distribution can be made lower) than in the case where the entire electrode tip portion is a flat surface (the electrode tip portion actually has a low degree of flatness and is likely to be in one-sided contact with each of the metal plate materials). Besides, a central portion of the electrode tip portion first comes into contact with each of the metal plate materials, so the film can be reliably destroyed. Furthermore, the current can be further restrained from becoming excessive than in the case where a tip of the projection portion is steepled. Owing to these, the reliability can be enhanced in curtailing the amount of energy needed to obtain the target nugget diameter.

Besides, the plurality of the recess portions may be dispersed at positions that are point-symmetric to each other with respect to a symmetric center respectively.

According to this, the current can be restrained from concentrating locally, an odd-shaped nugget can be restrained from being formed, and the reliability can be further enhanced in obtaining the target nugget diameter.

Besides, the plurality of the recess portions may be dispersed at the positions that are point-symmetric with respect to the position on the electrode centerline at the electrode tip portion.

According to this, the current can be more uniformly distributed at the electrode tip portion, and the materials to be joined (the metal plate materials) can be efficiently energized.

Besides, a depth of the recess portions may be equal to or greater than 30 μm and equal to or smaller than 150 μm.

This is because the film present on the surface of each of the metal plate materials cannot be sufficiently destroyed due to an insufficiency in the protrusion amount of the projection portion and the adhesion through melting may be caused when the depth of the recess portions is smaller than 30 μm. Besides, this is because a working tool (a transfer plate) for molding the recess portions may be damaged (protrusions for molding the recess portions may be damaged in molding the recess portions) when the depth of the recess portions is greater than 150 μm.

Besides, a distance between central positions of those of the recess portions which are adjacent to each other may be equal to or longer than 400 μm and equal to or shorter than 1200 μm.

This is because it is difficult to prepare the transfer plate when the distance between the central positions of those of the recess portions which are adjacent to each other is shorter than 400 μm. Besides, this is because the film cannot be sufficiently destroyed due to too large a contact area between the electrode and each of the metal plate materials and the adhesion through melting may be caused when the distance between the central positions of those of the recess portions which are adjacent to each other is longer than 1200 μm.

Besides, an opening end of each of the recess portions at the electrode tip portion may be square, and a length of one side of the opening end may be equal to or longer than 80 μm and equal to or shorter than 350 μm.

This is because the transfer plate may be damaged (the protrusions for molding the recess portions may be damaged in molding the recess portions) when the length of one side of the opening end of each of the recess portions is shorter than 80 μm. Besides, this is because local concentration of the current is promoted due to too small a contact area between the electrode and each of the metal plate materials and the adhesion through melting may be caused when the length of one side of the opening end of each of the recess portions is longer than 350 μm.

In the aspect of the disclosure, the electrode tip portion is provided with the projection portion and the recess portions, the plurality of the recess portions are independent of one another and are dispersed at the electrode tip portion, and the projection portion is the region other than the regions where the recess portions are provided and is configured to be equipped with the continuous surface that continues in the regions among the plurality of the recess portions without being divided by the recess portions. Thus, the current paths can be restrained from being enlarged due to the fringing phenomenon at the projection portion, and a high current density can be ensured in each of the current paths. Therefore, the respective metal plate materials can be joined to one another by efficiently melting the metal plate materials while keeping the welding current value low, and the amount of energy needed to obtain the target nugget diameter can be curtailed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One of the embodiments of the disclosure will be described hereinafter based on the drawings. In the present embodiment, a case where the disclosure is applied to an electrode for use in a resistance spot welding device for subjecting two aluminum alloy plate materials to resistance spot welding (which may be referred to hereinafter simply as welding) (an electrode for resistance spot welding) will be described.

Configuration of Resistance Spot Welding Device

Figure 1:
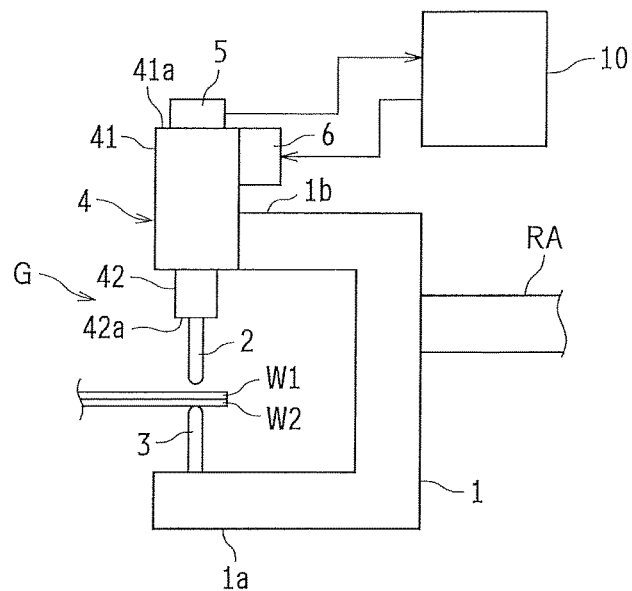
FIG. 1 is a schematic configuration view showing a welding gun of a resistance spot welding device according to one of the embodiments.
Figure 2:
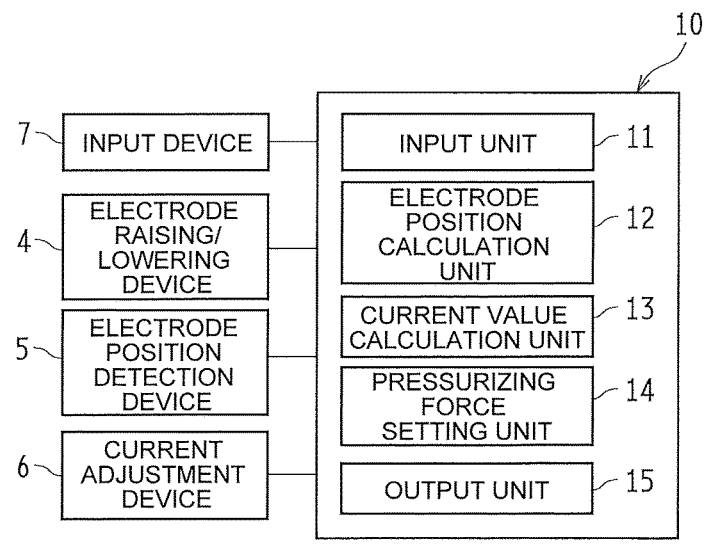
FIG. 2 is a view showing the schematic configuration of a control device of the welding gun.

FIG. 1 is a schematic configuration view showing a welding gun G of a resistance spot welding device in which electrodes 2 and 3 according to the present embodiment are used. Besides, FIG. 2 is a view showing the schematic configuration of a control device 10 that is used to control the welding gun G.

The welding gun G is configured to include, as main components, a gun body 1 that is retained by a robot arm RA, an upper electrode 2, a lower electrode 3 that is erected at a lower portion 1a of the gun body 1, an electrically-operated upper electrode raising/lowering device (hereinafter referred to simply as an electrode raising/lowering device) 4 that retains and raises/lowers the upper electrode 2, an electrode position detection device 5, and a current adjustment device 6 that adjusts a value of welding current caused to flow between the upper electrode 2 and the lower electrode 3 (which may be referred to hereinafter simply as a current value). Incidentally, in FIGS. 1, W1 and W2 denote metal plate materials (aluminum alloy plate materials).

As shown in FIG. 1, the gun body 1 is a substantially U-shaped member, and the lower electrode 3 is removably erected on an upper surface of the lower portion 1a of the gun body 1. Besides, the electrode raising/lowering device 4 is mounted at a tip of an upper portion 1b of the gun body 1.

The electrode raising/lowering device 4 is equipped with a servomotor 41 that is mounted at the tip of the upper portion 1b of the gun body 1, and a raising/lowering member 42 that is linked with a drive shaft (not shown) of this servomotor 41. The upper electrode 2 is removably mounted at a lower end portion 42a of this raising/lowering member 42.

The electrode position detection device 5 is configured as, for example, an encoder, and is mounted at an upper end portion 41a of the servomotor 41. Moreover, a detection value of the electrode position detection device 5 is transmitted to the control device 10.

The current adjustment device 6 adjusts a value of current caused to flow between the upper electrode 2 and the lower electrode 3, in accordance with a current command value that is transmitted from the control device 10. As this current adjustment device 6, a well-known device, for example, a device that is equipped with a variable resistor, a device that is equipped with a converter, or the like is applied.

The control device 10 is equipped, as main units, with an input unit 11 that acquires information from an input device 7 (see FIG. 2) to which plate thicknesses of the metal plate materials W1 and W2 and the like are input, an electrode position calculation unit 12 that calculates an electrode position from a detection value of the electrode position detection device 5, a current value calculation unit 13 that calculates a current value in carrying out energization between the upper electrode 2 and the lower electrode 3, a pressurizing force setting unit 14 that sets a pressurizing force necessary for welding (a pressurizing force applied to the metal plate materials W1 and W2 by the upper electrode 2 and the lower electrode 3), and an output unit 15 that outputs information on the current value calculated by the current value calculation unit 13 and information on the pressurizing force set by the pressurizing force setting unit 14.

This control device 10 is realized by storing a program corresponding to the function described above into a ROM, in a unit that is mainly composed of a CPU and that is equipped with the ROM, a RAM, an input/output interface, and the like. Besides, the detection value from the electrode position detection device 5 and information on the plate thicknesses and the like are temporarily stored into the RAM. Incidentally, the control device 10 is identical in other configurational details to those conventionally used for the welding gun G, so detailed description thereof will be omitted.

Configuration of Electrodes

Next, the configuration of the electrodes 2 and 3 as the feature of the present embodiment will be described. The upper electrode 2 and the lower electrode 3 are identical in configuration to each other. Therefore, the upper electrode 2 will now be described as a representative of both the electrodes.

Figure 3:
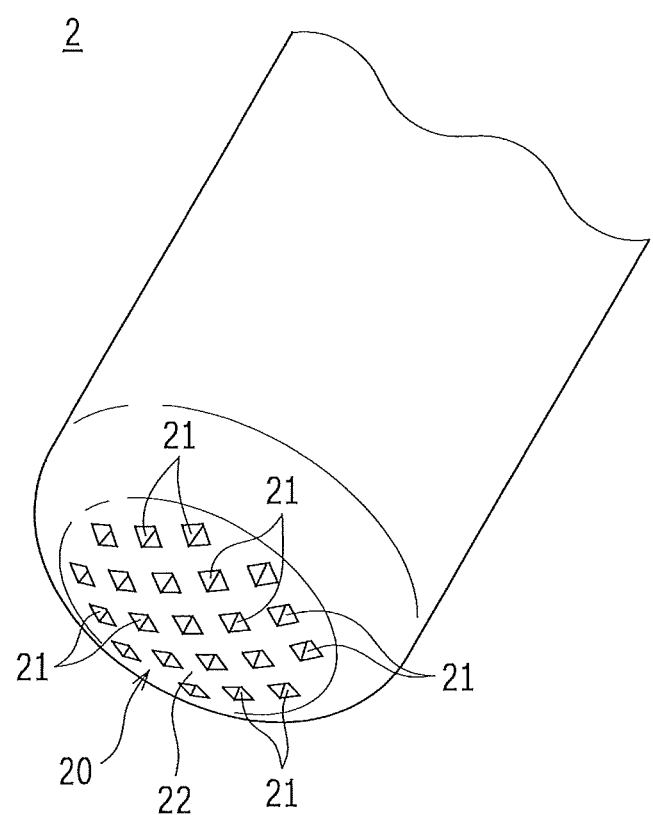
FIG. 3 is a perspective view of an upper electrode as viewed from below.
Figure 4:
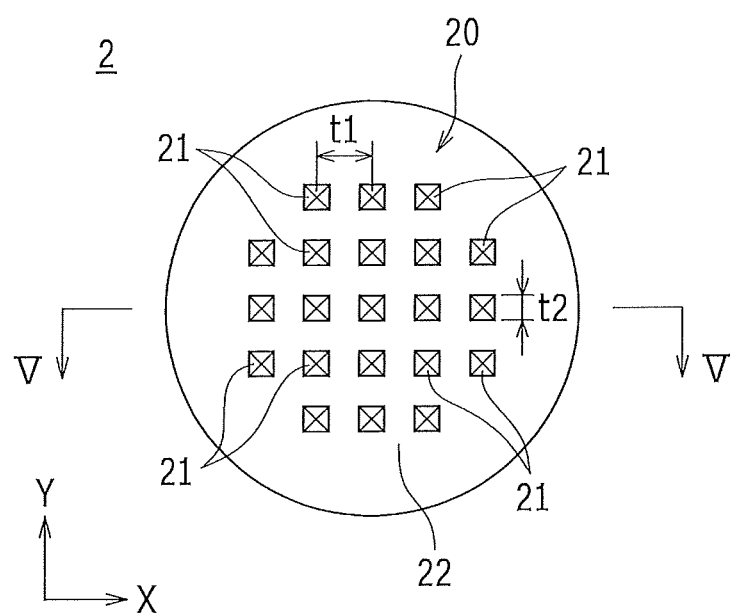
FIG. 4 is a bottom view of the upper electrode.
Figure 5:
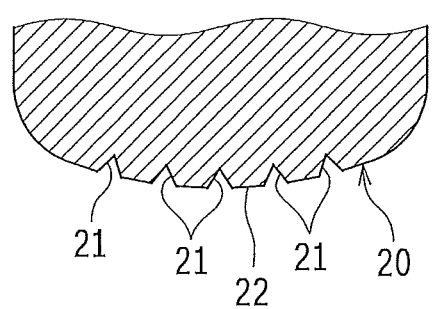
FIG. 5 is a cross-sectional view along a line V-V of FIG. 4.

FIG. 3 is a perspective view of the upper electrode 2 as viewed from below. FIG. 4 is a bottom view of the upper electrode 2. FIG. 5 is a cross-sectional view along a line V-V of FIG. 4.

This upper electrode 2 is configured as a copper material in which a copper alloy such as Cu—Cr, Cu—Cr—Zr or the like, and a hard material such as $Al_2O_3$ or the like are dispersed.

As shown in FIGS. 3 to 5, the upper electrode 2 is a substantially cylindrical member, and an electrode tip portion (a surface of the electrode tip portion) 20 for holding the metal plate materials W1 and W2 assumes the shape of a substantially spherical projection having a predetermined curvature radius. Besides, this upper electrode 2 has an outer diameter that is set in advance in accordance with a target nugget diameter at the time of welding.

Moreover, this electrode tip portion 20 is provided with recess portions 21 and a projection portion 22. These recess portions 21 and this projection portion 22 will be described hereinafter.

As a method of molding these recess portions 21 and this projection portion 22, molding according to transfer processing through the use of a transfer plate (not shown) is carried out. That is, a plurality of protrusions for molding the recess portions 21 are provided on this transfer plate. The electrode tip portion 20 (the electrode tip portion that assumes the shape of the substantially spherical projection as described previously) of the upper electrode 2 in which the recess portions 21 are not molded, or the electrode tip portion 20 of the upper electrode 2 that has become worn by being used for resistance spot welding is pressed against the transfer plate, and the protrusions on the transfer plate are transferred to the electrode tip portion (the surface of the electrode tip portion) 20 (subjected to transfer processing).

Thus, the recess portions 21 are molded, and a region other than these recess portions 21 is molded as the projection portion 22.

The plurality of the recess portions 21 are independent of one another, and are provided at the electrode tip portion 20 in a dispersed manner. These recess portions 21 are disposed (arranged) in a plurality of rows along a lateral direction (an X-direction) and a vertical direction (a Y-direction) in FIG. 4. In concrete terms, three of the recess portions 21 are disposed along the vertical direction (the Y-direction) in the first row at a right end in the lateral direction (the X-direction) in FIG. 4. Besides, three of the recess portions 21 are disposed along the vertical direction (the Y-direction) in the fifth row at a left end in the lateral direction (the X-direction) as well. Five of the recess portions 21 are disposed along the vertical direction (the Y-direction) in each of the other rows (the second to fourth rows) in the lateral direction (the X-direction). These recess portions 21 are provided, in a dispersed manner, in a region inside an outer edge portion of the electrode tip portion 20. The central one of the five recess portions 21 in the third row (the third recess portion 21 from above in the Y-direction) is located on a centerline of the upper electrode 2 (at a center of the electrode tip portion 20).

Each of the recess portions 21 is molded as a recess portion assuming the shape of a quadrangular pyramid. Each of the recess portions 21 is configured such that an outer edge shape (a square outer edge shape) thereof on a cross-section in a direction perpendicular to the centerline of the upper electrode 2 (the electrode centerline) gradually decreases in area (area of the square) toward a depth direction of each of the recess portions 21. Besides, each of the recess portions 21 is disposed such that respective sides of the square extend along the X-direction and the Y-direction. Furthermore, each of the recess portions 21 is shaped such that the centerline thereof (a straight line extending in a direction perpendicular to a virtual bottom surface of the quadrangular pyramid) extends along a direction along the centerline of the upper electrode 2 (a direction in which the upper electrode 2 is raised/lowered by the electrode raising/lowering device 4).

Besides, those of the recess portions 21 which are adjacent to each other are spaced apart from each other by the same distance in both the lateral direction (the X-direction) and the vertical direction (the Y-direction). For example, this distance is set longer than the length of one side of an opening end of each of the recess portions 21 by a predetermined dimension. Furthermore, the outermost ones of these recess portions 21 (which are located beside the outer edge portion of the electrode tip portion 20) are located inside, apart from the outer edge portion of the electrode tip portion 20 by the predetermined dimension. No recess portion is provided at the outer edge portion of this electrode tip portion 20.

The projection portion 22 is a region other than regions where the recess portions 21 are provided, and is configured to be equipped with a continuous surface that continues in regions among the plurality of the recess portions 21 without being divided by the recess portions 21. That is, the entire region of the electrode tip portion 20 where the plurality of the recess portions 21 are not provided is configured as the projection portion 22. As described previously, the electrode tip portion 20 assumes the shape of the substantially spherical projection having the predetermined curvature radius. Therefore, this projection portion 22 has a surface that also assumes the shape of a substantially spherical projection having a predetermined curvature radius. That is, the upper electrode 2 is formed as a projecting curved surface that bulges (protrudes) most at a position on the centerline thereof (on the electrode centerline), and is shaped such that the bulging amount (the protrusion amount) thereof gradually decreases toward an outer peripheral side thereof.

A concrete example of the dimensions of the recess portions 21 will now be described. The following respective dimensions are applied to a general electrode for resistance spot welding (e.g., an electrode for resistance spot welding that has an outer diameter of about 15 mm).

The depth of each of the recess portions 21 is set within a range that is equal to or greater than 30 µm and equal to or smaller than 150 µm. Besides, the distance (a pitch; a dimension t1 in FIG. 4) between central positions of those of the recess portions 21 which are adjacent to each other (adjacent to each other in the X-direction or the Y-direction) is set within a range that is equal to or longer than 400 µm and equal to or shorter than 1200 µm. Besides, the length (a dimension t2 in FIG. 4) of one side of the opening end of each of the recess portions 21 is set within a range that is equal to or longer than 80 µm and equal to or shorter than 350 µm.

The reason why the respective dimensions are thus set will be described. In the case where the depth of each of the recess portions 21 is smaller than 30 µm, an oxidation film present on the surfaces of the metal plate materials W1 and W2 cannot be sufficiently destroyed due to an insufficiency in the protrusion amount of the projection portion 22, and the adhesion through melting may be caused. In the case where the depth of each of the recess portions 21 is greater than 150 µm, the transfer plate for molding the recess portions 21 may be damaged (the protrusions for molding the recess portions 21 may be damaged in molding the recess portions 21). In the case where the distance between the central positions of those of the recess portions 21 which are adjacent to each other is shorter than 400 µm, it is difficult to prepare the transfer plate. In the case where the distance between the central positions of those of the recess portions 21 which are adjacent to each other is longer than 1200 µm, the oxidation film cannot be sufficiently destroyed due to too large a contact area between the electrode and each of the metal plate materials W1 and W2, and the adhesion through melting may be caused. In the case where the length of one side of the opening end of each of the recess portions 21 is shorter than 80 µm, the transfer plate may be damaged (the protrusions for molding the recess portions 21 may be damaged in molding the recess portions 21). In the case where the length of one side of the opening end of each of the recess portions 21 is longer than 350 µm, the local concentration of current is promoted due to too small a contact area between the electrode and each of the metal plate materials W1 and W2, and the adhesion through melting may be caused. The respective dimensions are set in consideration of the foregoing points.

At Time of Resistance Spot Welding

Next, the time of resistance spot welding through the use of the upper electrode 2 configured as described previously and the lower electrode 3 configured in the same manner as this upper electrode 2 will be described.

In carrying out resistance spot welding by holding the metal plate materials W1 and W2 by these electrodes 2 and 3, the oxidation film present on the surfaces of the metal plate materials W1 and W2 is destroyed over an extensive range by the projection portion 22, when the metal plate materials W1 and W2 are held by these electrodes 2 and 3. That is, the plurality of the recess portions 21 are provided in the electrode tip portion 20, and the electrode tip portion 20 is partially in contact with each of the metal plate materials W1 and W2 (only the projection portion 22 is in contact with each of the metal plate materials W1 and W2). Therefore, the stress applied to that region of each of the metal plate materials W1 and W2 with which the projection portion 22 is in contact is enhanced, and the oxidation film is destroyed over an extensive range.

In the case where the oxidation film has not been destroyed, current concentrates on a weak region of the oxidation film at the time of welding, and the electrode tip portion may melt and adhere to each of the metal plate materials as a result of a local rise in temperature. In contrast, according to the present embodiment, the oxidation film is destroyed over an extensive range. Therefore, current can be kept from concentrating on part of each of the metal plate materials W1 and W2, and the electrode tip portion can be restrained from melting and adhering to each of the metal plate materials W1 and W2.

Moreover, with the metal plate materials W1 and W2 held by the electrodes 2 and 3 as described previously, energization is carried out between the electrodes 2 and 3, the metal plate materials W1 and W2 are partially melted to form a nugget, and the respective metal plate materials W1 and W2 are joined to each other. In this case, the recess portions 21 that are provided in the electrode tip portion 20 as described previously are independent of one another, and are dispersed at the electrode tip portion 20. Therefore, the current paths can be further restrained from being enlarged due to a fringing phenomenon at the projection portion 22 (the current paths can be further restrained from being enlarged in a direction perpendicular to a plate thickness direction of the metal plate materials W1 and W2), and a higher current density can be ensured in each of the current paths, than in the configuration in which the recess portions are continuous along the circumferential direction (the configuration of Japanese Patent Application Publication No. 2000-288744 (JP 2000-288744 A)). Therefore, the respective metal plate materials W1 and W2 can be joined to each other by efficiently melting the metal plate materials W1 and W2 while keeping the current value (the welding current value) low.

Figure 6:
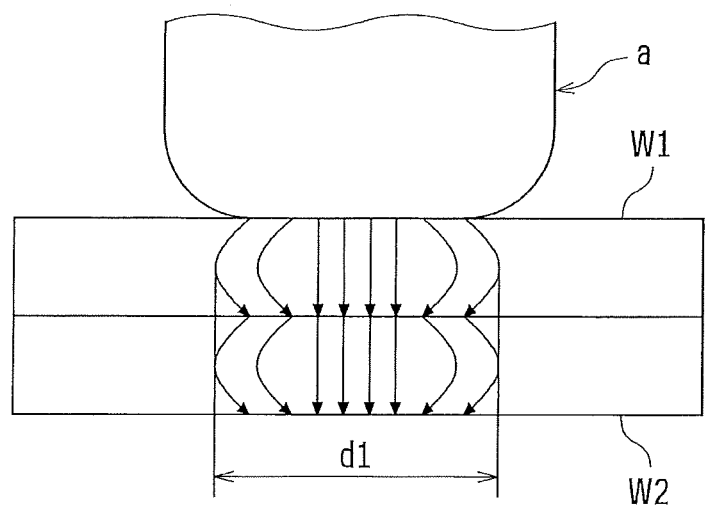
FIG. 6 is a schematic view showing the flow of current through respective metal plate materials in the case where an electrode having an electrode tip portion that is entirely a flat surface is used.
Figure 7:
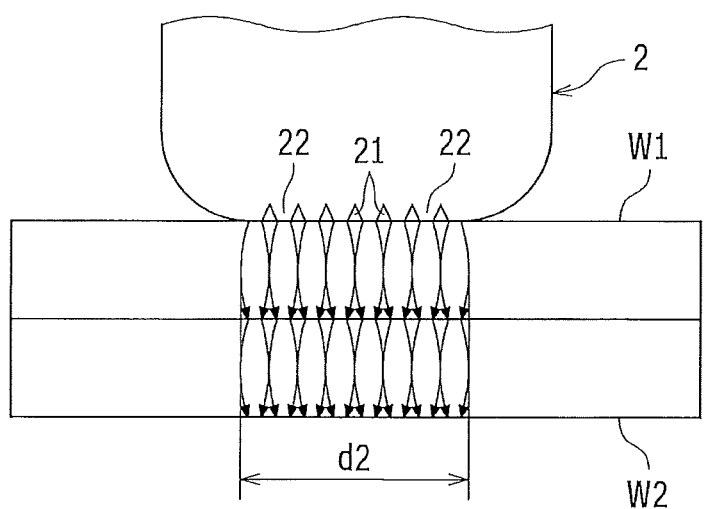
FIG. 7 is a schematic view showing the flow of current through respective metal plate materials in the case where the electrode according to the embodiment is used.

FIG. 6 is a schematic view showing the flow of current through the respective metal plate materials W1 and W2 in the case where an electrode a having an electrode tip portion that is entirely a flat surface is used. Besides, FIG. 7 is a schematic view showing the flow of current through the respective metal plate materials W1 and W2 in the case where the electrode (the upper electrode) 2 according to the present embodiment is used. Both of these drawings FIGS. 6 and 7 show the flow of current in the case where the electrodes a, 2 of the same diameter are used respectively. Besides, in each of these drawings FIGS. 6 and 7, only the upper electrode is shown as each of the electrodes a, 2.

As shown in FIG. 6, in resistance spot welding, the fringing phenomenon causing enlargement of the current paths in the respective metal plate materials W1 and W2 occurs. In FIG. 6, the current paths are enlarged to a dimension d1 in FIG. 6 due to this fringing phenomenon. Meanwhile, in FIG. 7, the current paths are restrained from being enlarged beyond a dimension d2 in FIG. 7 due to this fringing phenomenon (the reason for this will be described later).

On the cross-section of the upper electrode 2 shown in FIG. 7, the projection portion 22 is divided by the respective recess portions 21 (the projection portion 22 is not divided by the respective recess portions 21 at the electrode tip portion 20 as a whole as shown in FIG. 4, although being divided on the cross-section shown in FIG. 7), and there are a plurality of contact regions (regions that are in contact with the metal plate material W1). Current flows through each of the metal plate materials W1 and W2 in each of these contact regions (each of current paths is produced), and there is a region through which no current flows between some of the current paths that are adjacent to each other. Besides, the current paths are estimated to be further restrained from being enlarged due to the fringing phenomenon as the width of the contact regions that are in contact with the metal plate material W1 (the contact regions of the electrode tip portion 20) decreases. Thus, the current paths are estimated to be restrained from being enlarged beyond the dimension d2 due to the fringing phenomenon at the projection portion 22 as described previously. Therefore, a high current density can be ensured in each of the current paths, and the respective metal plate materials W1 and W2 can be joined to each other by efficiently melting the metal plate materials W1 and W2 while keeping the welding current value low. Besides, this projection portion 22 is the region other than the regions where the recess portions 21 are provided, and hence reaches the outer edge portion of the electrode tip portion 20. That is, a contact range sufficient to obtain a target nugget diameter is ensured. As a result, the amount of energy needed to obtain the target nugget diameter can be curtailed.

Effect of Embodiment

As described above, in the present embodiment, the electrode tip portion 20 is provided with the projection portion 22 and the recess portions 21, the plurality of the recess portions 21 are made independent of one another and dispersed at the electrode tip portion 20, and the projection portion 22 is the region other than the regions where the recess portions 21 are provided, and is configured to be equipped with the continuous surface that continues in the regions among the plurality of the recess portions 21 without being divided by the recess portions 21. Thus, the current paths can be restrained from being enlarged due to the fringing phenomenon at the projection portion 22, and a high current density can be ensured in each of the current paths. Therefore, the respective metal plate materials W1 and W2 can be joined to each other by efficiently melting the metal plate materials W1 and W2 while keeping the welding current value low, and the amount of energy needed to obtain the target nugget diameter can be curtailed.

Besides, in the present embodiment, the continuous surface that constitutes the projection portion 22 is formed as the projecting curved surface that bulges most at the position on the electrode centerline. Therefore, the current flowing through the metal plate materials W1 and W2 at the time of resistance spot welding can be more appropriately distributed (distributed in a more unbiased manner) than in the case where the entire electrode tip portion is a flat surface. Besides, a central portion of the electrode tip portion 20 first comes into contact with each of the metal plate materials W1 and W2, so the oxidation film can be reliably destroyed. Furthermore, excessive current can be further restrained from flowing than in the case where the tip of the projection portion is steepled. Owing to these, the reliability can be enhanced in curtailing the amount of energy needed to obtain the target nugget diameter.

Besides, in the present embodiment, the plurality of the recess portions 21 are dispersed at the positions of the electrode tip portion 20 that are point-symmetric with respect to the position on the electrode centerline. Thus, the current flowing through the metal plate materials W1 and W2 at the time of resistance spot welding can be uniformly distributed. Therefore, current can be restrained from concentrating locally, and the metal plate materials W1 and W2 can be efficiently energized. As a result, an odd-shaped nugget can be restrained from being formed, and the reliability can be further enhanced in obtaining the target nugget diameter. Incidentally, the technical concept of the disclosure is not limited to the case where the plurality of the recess portions 21 are dispersed at the positions of the electrode tip portion 20 that are point-symmetric with respect to the position on the electrode centerline, but includes a case where the plurality of the recess portions 21 are dispersed at positions that are point-symmetric to each other respectively with respect to a symmetric center (the plurality of the recess portions 21 are not point-symmetric with respect to the position on the electrode centerline). This is because the plurality of the recess portions 21 are dispersed at the positions that are point-symmetric to each other respectively with respect to the symmetric center instead of being dispersed at the positions that are point-symmetric with respect to the position on the electrode centerline at the electrode tip portion 20 if the central position of the transfer plate and the position on the electrode centerline of the electrode tip portion 20 deviate from each other.

First Experimental Example

Next, a first experimental example conducted to confirm the foregoing effect will be described. This experimental example was conducted by measuring the amount of energy needed to obtain the target nugget diameter when the metal plate materials (the aluminum alloy plate materials) W1 and W2 were welded by the electrode according to the foregoing Japanese Patent Application Publication No. 2000-288744 (JP 2000-288744 A) and the electrodes 2 and 3 according to the present embodiment.

Figure 8:
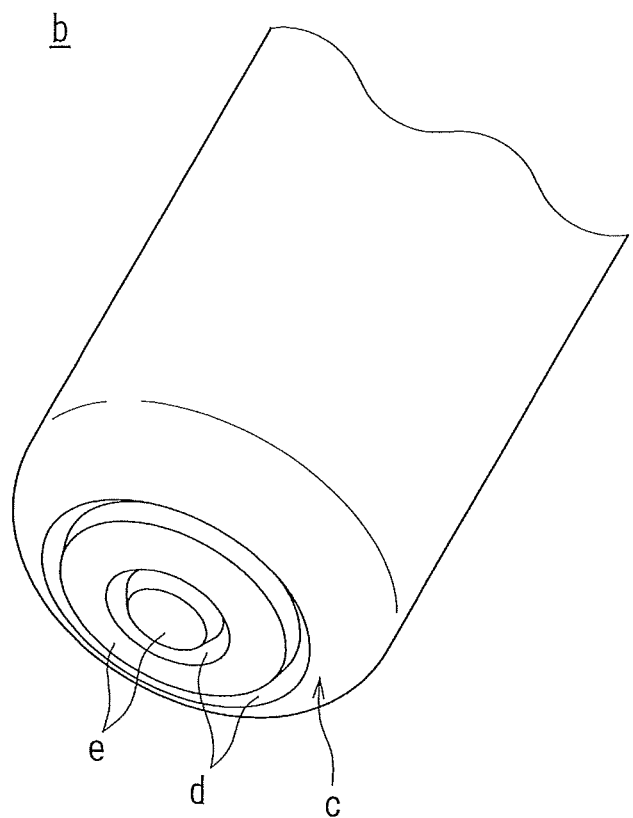
FIG. 8 is a perspective view of an upper electrode according to Japanese Patent Application Publication No. 2000-288744 (JP 2000-288744 A) as viewed from below.
Figure 9:
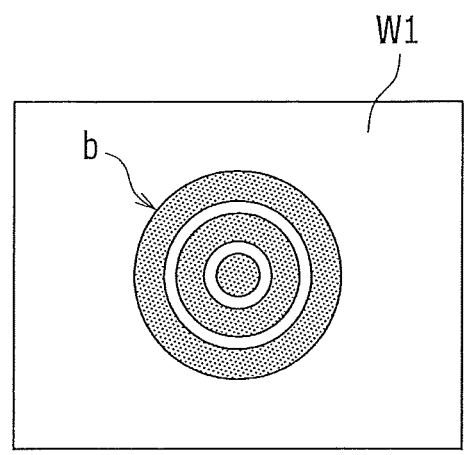
FIG. 9 is a view for illustrating a contact region between the electrode and each of the metal plate materials according to Japanese Patent Application Publication No. 2000-288744 (JP 2000-288744 A)
Figure 10:
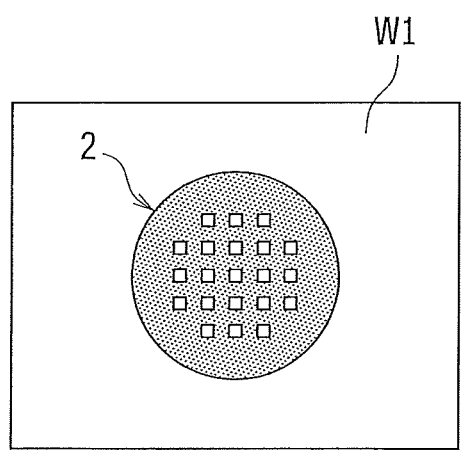
FIG. 10 is a view for illustrating a contact region between the electrode and each of the metal plate materials according to the embodiment.

FIG. 8 is a perspective view of an upper electrode (which may be referred to hereinafter simply as an electrode) b according to Japanese Patent Application Publication No. 2000-288744 (JP 2000-288744 A) as viewed from below. As shown in this FIG. 8, the electrode b according to Japanese Patent Application Publication No. 2000-288744 (JP 2000-288744 A) has an electrode tip portion c where recesses d and projections e are provided in such a manner as to spread like concentric ripples. Besides, FIG. 9 is a view for illustrating a contact region between the electrode b according to this Japanese Patent Application Publication No. 2000-288744 (JP 2000-288744 A) and the metal plate material W1. Besides, FIG. 10 is a view for illustrating a contact region between the upper electrode (which may be referred to hereinafter simply as the electrode) 2 according to the present embodiment and the metal plate material W1. In each of this FIG. 9 and this FIG. 10, the contact region between each of the electrodes b and 2 and the metal plate material W1 is dotted.

A comparison between these reveals that the amount of energy needed to obtain the target nugget diameter was larger when welding was carried out through the use of the electrode b according to Japanese Patent Application Publication No. 2000-288744 (JP 2000-288744 A) than when welding was carried out through the use of the electrode 2 according to the present embodiment. This is considered to be ascribable to the fact that the current paths were further restrained from being enlarged due to the foregoing fringing phenomenon when the electrode 2 according to the present embodiment was used. In addition, when the electrode b according to Japanese Patent Application Publication No. 2000-288744 (JP 2000-288744 A) was used, the recess portions d and the projection portions e formed concentric circles, and the current density was also distributed in the form of concentric circles, so the amount of necessary energy is considered to have increased as a result of the continuous occurrence of contrasting density. In contrast, when the electrode 2 according to the present embodiment was used, the amount of necessary energy is estimated to have been restrained from increasing because the materials to be joined could be efficiently energized through the entire region of the electrode tip portion 20 as a result of uniform distribution of current at the electrode tip portion 20 by the recess portions 21.

Second Experimental Example

Next, a second experimental example will be described. This experimental example was conducted by measuring the relationship between the current value (the welding current value) and the nugget diameter when the metal plate materials (the aluminum alloy plate materials) were welded by each of an electrode having an electrode tip portion that is entirely a flat surface (hereinafter referred to as a first comparative example), the electrode according to the foregoing Japanese Patent Application Publication No. 2000-288744 (JP 2000-288744 A) (hereinafter referred to as a second comparative example), and the electrode according to the present embodiment.

Figure 11:
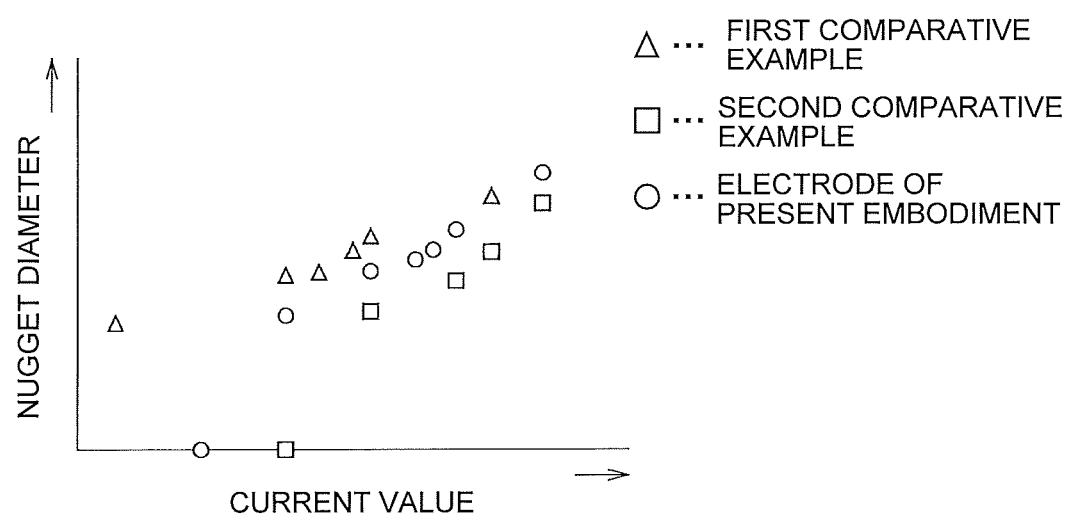
FIG. 11 is a view showing an experimental result obtained by measuring a relationship between a current value and a nugget diameter in the case where the metal plate materials are welded by each of the electrode having the electrode tip portion that is entirely the flat surface, the electrode according to Japanese Patent Application Publication No. 2000-288744 (JP 2000-288744 A), and the electrode according to the embodiment.

FIG. 11 is a view showing an experimental result of the second experimental example. Each triangle in this FIG. 11 indicates the use of the electrode of the first comparative example, each square in this FIG. 11 indicates the use of the electrode of the second comparative example, and each circle in this FIG. 11 indicates the use of the electrode of the present embodiment.

As is apparent from this FIG. 11, when the current value remains the same, the nugget diameter increases in the sequence of the second comparative example, the present embodiment, and the first comparative example. In other words, the current value for obtaining the same nugget diameter decreases in the sequence of the second comparative example, the present embodiment, and the first comparative example. However, in the case of the electrode of the first comparative example, the adhesion through melting may be caused because the oxidation film is not destroyed as described previously. For example, in the case where welding is successively carried out, the adhesion through melting may be caused after carrying out welding about 20 times (when welding is carried out more or less for the 20th time). In contrast, in the cases of the electrode of the second comparative example and the electrode of the present embodiment, the adhesion through melting is not caused even when welding is successively carried out several tens of times.

The foregoing has confirmed that the amount of energy needed to obtain the target nugget diameter can be made smaller without causing the adhesion through melting when the electrode of the present embodiment is used than when the electrode of the second comparative example is used.

First Modification Example

Next, a first modification example will be described. The present modification example is different from the foregoing embodiment in the manner in which the recess portions 21 that are provided in the electrode tip portion 20 are arranged.

Accordingly, only the manner in which the recess portions 21 are arranged will be described hereinafter.

Figure 12:
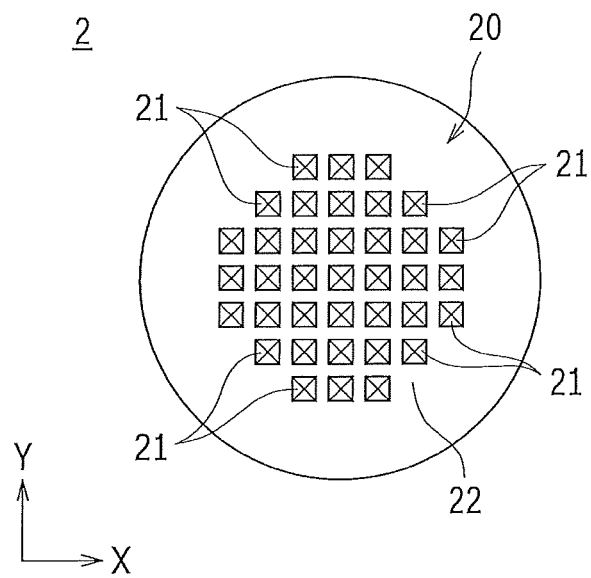
FIG. 12 is a view corresponding to FIG. 4 in a first modification example.

FIG. 12 is a view corresponding to FIG. 4 in the present modification example. As shown in this FIG. 12, in the upper electrode 2 according to the present modification example as well, the plurality of the recess portions 21 are independent of one another, and are provided at the electrode tip portion 20 in a dispersed manner.

Moreover, in the present modification example, three of the recess portions 21 are disposed along the vertical direction (the Y-direction) in the first row at the right end in the lateral direction (the X-direction) in FIG. 12. Besides, three of the recess portions 21 are disposed along the vertical direction (the Y-direction) in the seventh row at the left end in the lateral direction (the X-direction) as well. Besides, five of the recess portions 21 are disposed along the vertical direction (the Y-direction) in the second row at the second position from the right end in the lateral direction (the X-direction). Besides, five of the recess portions 21 are disposed along the vertical direction (the Y-direction) in the sixth row at the second position from the left end in the lateral direction (the X-direction) as well. Moreover, seven of the recess portions 21 are disposed along the vertical direction (the Y-direction) in each of the other rows (the third to fifth rows) in the lateral direction (the X-direction). Besides, the central one (the fourth from above in the Y-direction) of the seven recess portions 21 in the fourth row is located on the centerline of the upper electrode 2 (the center of the electrode tip portion 20). The present modification example is identical in the other configurational details to the foregoing embodiment.

The upper electrode 2 in the present modification example can also achieve an effect similar to that of the foregoing embodiment. Besides, the number of recess portions 21 in the present modification example is larger than the number of recess portions 21 in the foregoing embodiment. In the present modification example, therefore, the dimensions (the dimension in the X-direction and the dimension in the Y-direction) of the projection portion 22 between those of the recess portions 21 which are adjacent to each other can be made short, the current paths can be restrained from being enlarged (the current paths can be restrained from being enlarged in the direction perpendicular to the plate thickness direction of the metal plate materials W1 and W2) due to the fringing phenomenon, and the materials to be joined can be efficiently energized through the entire region of the electrode tip portion 20. Thus, the amount of energy needed to obtain the target nugget diameter can be further curtailed.

Second Modification Example

Next, a second modification example will be described. The present modification example is also different from the foregoing embodiment in the manner in which the recess portions 21 that are provided in the electrode tip portion 20 are arranged. Accordingly, only the manner in which the recess portions 21 are arranged will be described hereinafter as well.

Figure 13:
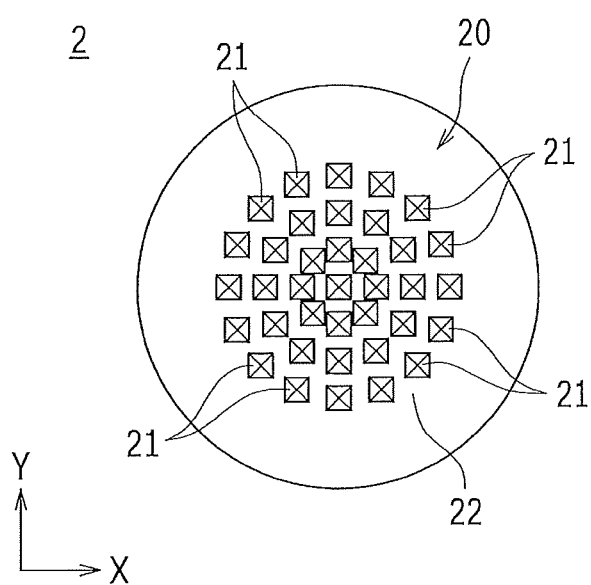
FIG. 13 is a view corresponding to FIG. 4 in a second modification example.

FIG. 13 is a view corresponding to FIG. 4 in the present modification example. As shown in this FIG. 13, the upper electrode 2 according to the present modification example is configured such that the respective recess portions 21 are disposed on a plurality of virtual circular loci on concentric circles. Besides, the recess portions 21 are disposed such that the distance between those of the recess portions 21 which are adjacent to each other decreases as the distance thereof to the central side decreases.

The upper electrode 2 in the present modification example can also achieve an effect similar to that of the foregoing embodiment.

Other Embodiments

Incidentally, the disclosure is not limited to the foregoing embodiment and the respective modification examples, but can be subjected to all the modifications and applications that are encompassed by the claims and those equivalent in scope thereto.

For example, in each of the foregoing embodiment and the respective modification examples, the case where the disclosure is applied to the electrodes 2 and 3 for use in the resistance spot welding device for welding the two aluminum alloy plate materials W1 and W2 to each other has been described. The disclosure is not limited to this, and can also be applied to the electrodes 2 and 3 for use in a resistance spot welding device for welding other metal plate materials to each other. For example, the disclosure can be applied to the electrodes 2 and 3 for use in a resistance spot welding device for welding ultra-high tensile strength steel plates (hot stamp materials), which are prepared by being subjected to special processing (press working) while being heated, to each other. Besides, the disclosure can also be applied to the electrodes 2 and 3 for use in a resistance spot welding device for welding three or more metal plate materials to one another.

Besides, in each of the foregoing embodiment and the respective modification examples, the electrode tip portion 20 is provided with the recess portions 21 and the projection portion 22 for the purpose of destroying the oxidation film. The disclosure is not limited to this, and may be applied to metal plate materials where there is no oxidation film, and the electrode tip portion 20 may be provided with the recess portions 21 and the projection portion 22 for the purpose of eliminating the influence of a mold releasing agent and an oil film present on the surfaces of the metal plate materials.

Besides, in each of the foregoing embodiment and the respective modification examples, each of the recess portions 21 is molded as a recess portion assuming the shape of a quadrangular pyramid. The disclosure is not limited to this, and each of the recess portions 21 may be molded as a recess portion assuming the shape of a circular cone, a triangular pyramid or the like.

Besides, in each of the foregoing embodiment and the respective modification examples, the recess portions 21 and the projection portion 22 with which the electrode tip portion 20 is provided are molded through transfer processing through the use of the transfer plate. The disclosure is not limited to this, and the recess portions 21 and the projection portion 22 may be molded according to other processing methods (e.g., cutting and the like).

Besides, in each of the foregoing embodiment and the first modification example, the plurality of the recess portions 21 are disposed and dispersed in the X-direction and the Y-direction. Besides, in the second modification example, the plurality of the recess portions 21 are disposed on the plurality of the virtual circular loci of the concentric circles at the electrode tip portion 20. The disclosure is not limited to these, and the plurality of the recess portions 21 may be dispersed randomly, for example, at positions that are nonsymmetric with respect to the position on the electrode centerline at the electrode tip portion 20.

Besides, in each of the foregoing embodiment and the respective modification examples, the electrode tip portion 20 assumes the shape of the substantially spherical projection having the predetermined curvature radius. The disclosure is not limited to this, and the electrode tip portion 20 may be a flat surface. That is, it is possible to adopt a configuration in which the recess portions 21 and the projection portion 22 are provided in/on the flat surface.

The disclosure can be applied to an electrode for resistance spot welding for welding aluminum alloy plate materials.

What is claimed is:

1. A resistance spot welding method comprising:
holding a plurality of metal plate materials superimposed on one another along a plate thickness direction of the metal plate materials by electrodes for resistance spot welding; and
joining the metal plate materials to one another through energizing the electrodes, wherein
each of the electrodes includes an electrode tip portion configured to hold each of the metal plate materials being provided with a projection portion and a plurality of recess portions,
the plurality of the recess portions, which are independent of one another, are provided in the electrode tip portion in a dispersed manner,
the projection portion is a region other than regions where the recess portions are provided, and is configured to be equipped with a continuous surface that continues in regions among the plurality of the recess portions without being divided by the recess portions, and
the projection portion contacts with a film present on surfaces of the metal plate materials in holding a plurality of metal plate materials superimposed on one another along a plate thickness direction of the metal plate materials by the electrodes.

2. The resistance spot welding method according to claim 1, wherein
the continuous surface that constitutes the projection portion is formed as a projecting curved surface that bulges most at a position on an electrode centerline.

3. The resistance spot welding method according to claim 1, wherein
the plurality of the recess portions are dispersed at positions that are point-symmetric to each other with respect to a symmetric center respectively.

4. The resistance spot welding method according to claim 3, wherein
the plurality of the recess portions are dispersed at the positions that are point-symmetric with respect to a position on an electrode centerline at the electrode tip portion.

5. The resistance spot welding method according to claim 1, wherein
a depth of the recess portions is equal to or greater than 30 μm and equal to or smaller than 150 μm.

6. The resistance spot welding method according to claim 1, wherein
a distance between central positions of those of the recess portions which are adjacent to each other is equal to or longer than 400 μm and equal to or shorter than 1200 μm.

7. The resistance spot welding method according to claim 1, wherein
an opening end of each of the recess portions at the electrode tip portion is square, and
a length of one side of the opening end is equal to or longer than 80 μm and equal to or shorter than 350 μm.

8. The resistance spot welding method according to claim 1, wherein the metal plate materials consists of a single material.

9. The resistance spot welding method according to claim 8, wherein the single material is aluminum.

* * * * *